United States Patent [19]

Momiyama et al.

[11] 4,295,723
[45] Oct. 20, 1981

[54] SINGLE LENS REFLEX CAMERA

[75] Inventors: Kikuo Momiyama, Yokohama; Kenichi Kumazawa, Machida, both of Japan

[73] Assignee: Canon Kabushiki Kaisha, Tokyo, Japan

[21] Appl. No.: 97,833

[22] Filed: Nov. 26, 1979

[30] Foreign Application Priority Data

Nov. 24, 1978 [JP] Japan .............................. 53-145114

[51] Int. Cl.³ ...................... G03B 17/20; G03B 19/12
[52] U.S. Cl. .................................. 354/155; 354/225; 354/289
[58] Field of Search ...................... 354/155, 225, 289

[56] References Cited

U.S. PATENT DOCUMENTS

| | | | |
|---|---|---|---|
| 3,800,655 | 4/1974 | Uchida | 354/225 |
| 3,911,457 | 10/1975 | Okuno | 354/155 X |
| 3,962,710 | 6/1976 | Okuno et al. | 354/225 |
| 4,118,723 | 10/1978 | Yamazaki et al. | 354/155 |
| 4,131,355 | 12/1978 | Kumura et al. | 354/225 |

Primary Examiner—John Gonzales
Attorney, Agent, or Firm—Toren, McGeady & Stanger

[57] ABSTRACT

A single lens reflex camera in which the barrel information image is indicated in the lower portion of the image of an object view field and the image of photographing informations arranged on portions other than the lens barrel is indicated in the finder. Two windows for introducing the information lights are arranged on the front non-reflecting surface of the penta prism in a vertical direction with respect to the plane including the edge line separating the roof surfaces of the penta prism. One of the windows is relatively small, and positioned remote from the edge line, while the other window is relatively large, transversing the edge line. The barrel information light is turned in the above vertical direction by a mirror provided just above the barrel, and introduced into the penta prism from the one window through an intermediate mirror, while the photographing information light is introduced into the penta prism from the other window. The lights thus introduced pass the same optical path in the plane mentioned above and are emitted from the exit surface of the penta prism, and the lights thus emitted are reflected in the prism arranged between the exit surface of the penta prism and the ocular and directed to the lower portion of the ocular.

4 Claims, 10 Drawing Figures cluding the edge line separating the roof surfaces of the penta roof prism and the optical axis of the objective lens, namely arranged in a line vertical to the plane of FIG. 1.

The second suface 9b may be arranged opposing to the front inclined surface 1d with a small space therebetween, but it is more advantageous to connect these surfaces because the concave lens 9 and the penta roof prism 1 can be easily handled as one body. 10, 11 and 12 respectively represent a reflecting member. In the embodiment shown in FIGS. 1 and 2, 10 is a planar mirror, 11 and 12 are a triangle prism mirror. 6 represents informations indicated on the outer circumference of the lens barrel, such as a diaphragm scale marked around a diaphragm scale ring as illustrated in FIGS. 1 and 2. The indication information light M from the diaphragm scale 6 is reflected sidewise by the prism mirror 12 positioned near the center of the front inclined surface 1d of the penta proof prism, there is reflected upward by the prism mirror 11 and is further reflected by the planar mirror 10 to be directed to the concave lens 9, by which the light is refracted and directed below the rear exit surface 1e of the prism 1 from the surface 9b connected to the front inclined surface 1d almost at the same angle as the other indication information light L. After the emittance from the rear exit surface 1e of the prism 1, the light M is directed to the ocular 3 along the same course as the other indication information light L. Then as shown in FIG. 3, the information 6 is indicated as an indicated informations 6', and the informations 71 and 72 are indicated as indicated informations 71' and 72' all together adjacently at predetermined positions below the photographing view field F of the finder.

According to the above embodiment, the reflection by the surfaces 2a and 2b in the sub-prism 2 is a total reflection. The planar mirror 10, the prism mirrors 11 and 12, all being the reflecting member, may be substituted by a prism mirror and a planar mirror respectively.

The above embodiment has advantages that the diaphragm scale marked around the outer circumference of the lens barrel and the shutter scale and the meter pointer located on the upper portion of the penta roof prism can be simultaneously and adjacently observed below the photographing view field of the finder, and that the amplitude of the indicated information can be made large enough because the diaphragm scale information which is of small amplitude is indicated in the marginal portion while the shutter scale information which is of large amplitude is indicated in the central portion.

FIGS. 4 and 5 show a second embodiment of the present invention, in which 1 is a penta roof prism, 2 is a sub-prism, 3 is an ocular. The arrangement of these members is almost same as in FIGS. 1 and 2. According to the second embodiment, the indication information lights L and M are reflected by the surfaces 2c, 2e and 2d in the sub-prism in such a manner that these lights are directed to the ocular. Instead of the diaphragm scale in the first embodiment, the distance scale is marked around the lens barrel in the second embodiment.

The optical path of the indication information light M for the distance scale is almost same as the embodiment shown in FIGS. 1 and 2 except that the concave lens 9 is arranged between the planar mirrors 10 and 11. Also the other information is an illuminant diode for signal indication which indicates informations of the shutter, diaphragm etc. The optical path of the indication information light L from the diode 7 is almost same as the embodiment shown in FIGS. 1 and 2, except that a planar mirror 8 is used in place of the triangle prism as the reflecting member, and the light is introduced to this reflecting member through an auxiliary mirror 13.

FIG. 7 shows a third embodiment of the present invention, in which a third information in addition to the two informations shown in FIGS. 1 and 2 is indicated on the side of the photographing view field of the finder. The optical paths of the light L for the information marked around the outer circumference of the lens barrel and the light M for the informations marked on the upper portion of the penta roof prism are almost same as in the embodiment shown in FIGS. 1 and 2.

According to the third embodiment, the penta roof prism 1 has a bottom incidence surface 1a with its side face forming slantly worked a transmitting surface 15a. 15 is a triangle prism having a transmitting surfaces 15a and 15b and a reflecting surface 15c coated with a reflecting film. The transmitting surface 15b is arranged so as to oppose to the transmitting surface 15b of the penta roof prism with a small space therebetween. 16 is means for indicating informations such as a shutter scale, a diaphragm scale and a meter pointer. The indication information light N from the information indicating means enters the prism 15 from the transmitting surface 15a of the triangle prism 15, then is emitted from the transmitting surface 15b by the total reflection on the transmitting surface 15b and reflection on the reflecting surface 15c and is directed to the transmitting surface 1g of the penta roof prism.

From the surface 1g, the light enters the prim 1 and is directed to the accurate via the same optical path as the light of the photographing view field and is indicated as an indicated information 16 on the side of the photographing view field. According to this third embodiment, it is possible to indicate many informations, and it is also possible to interchangeably indicate informations of diaphragm preference mode below the photographing view field and the informations of shutter-preference mode on the side of the view field.

FIGS. 9 and 10 illustrate a fourth embodiment of the present invention, which is quite similar to the embodiment shown in FIG. 4 except that the prism 2 is arranged between the exit surface and the ocular and is bounded with the exit surface 1e of the penta prism 1, and that the upper surface 2e of the prim forms a transmitting surface.

Therefore, the information light reflected on the reflecting surface 2c transmits the surface 2e and is then reflected on the mirror 20 toward the reflecting surface 2d, while the mirror 20 is supported by a mirror supporting member 22 rotatable by a rotation shaft 21. Therefore, by rotation of a lever 23 which controls the rotation of the rotation shaft 21, the light from the reflecting surface 2c is no more reflected toward the reflecting surface 2d. Therefore, it is possible to discontinue the indication by the operation of this lever in case the indication is not necessary.

The present invention having structural features as above described has advantages that the diaphragm scale marked around the outer circumference of the lens barrel and the shutter scale and the meter pointer located on the upper portion of the penta roof prism can be simultaneously and adjacently observed below the photographing view field of the finder, and that the amplitude of the indicated information can be made large enough because the diaphragm scale information

SINGLE LENS REFLEX CAMERA

BACKGROUND OF THE INVENTION

1. Field of the Invention

The present invention relates to a finder for a single lens reflex camera, which finder can simultaneously and adjacently indicate photographing informations provided at different positions of a camera, such as informations of diaphragm scale etc. marked on the outer circumference of a lens barrel together with the photographing field of view below the photographing field of view within the finder view field and informations of shutter times etc. marked around a penta roof-prism.

2. Description of the Prior Art

As a finder for a single lens reflex camera which can indicate two or more kinds of photography informations, such as information of a diaphragm scale marked on the outer circumference of a lens barrel and information of shutter times, a finder is known in which the diaphragm scale, for example, is indicated below the photographing view field while the shutter time is indicated on the side of the view field. However, this conventionally known finder has a disadvantage such that it is difficult to observe the informations simultaneously, because they are indicated at different positions in the finder view field. Meanwhile, other conventionally known informations indicating means have disadvantages such that the amplitude of indicated informations is not large enough, that the structure is complicated, or that it is necessary to change the shape of the penta prism increase the size thereof. Further, the conventionally known information indicating means are confronted with by the following disadvantage is cases where the image of lens barrel information is to be indicated together with other photographing information images adjacently in the lower portion of the photographing view field, particularly when the photographing information image is a long one, such as when the information is concerned with a shutter time scale or a meter pointer. Thus, as the lens barrel information is positioned on the optical axis of an objective lens which constitute the center of a finder optical system, this lens barrel information is necessarily indicated at the center of the lower portion of the photographing view field when an ordinary indicating optical system for the barrel information is used. Therefore, the long information image is indicated outside the central portion, and thus is very difficult to observe.

SUMMARY OF THE INVENTION

Therefore, one of the objects of the present invention is to provide a finder of small size for a single lens reflex camera, which finder can simultaneously indicate two informations, such as diaphragm scale informations indicated on the outer circumference of a lens barrel and other informations provided on different positions, adjacently below the photographing view field within a finder view field.

DETAILED DESCRIPTION OF THE INVENTION

Description of Preferred Embodiments

The present invention will be better understood from the following description of preferred embodiments.

Figure 1:
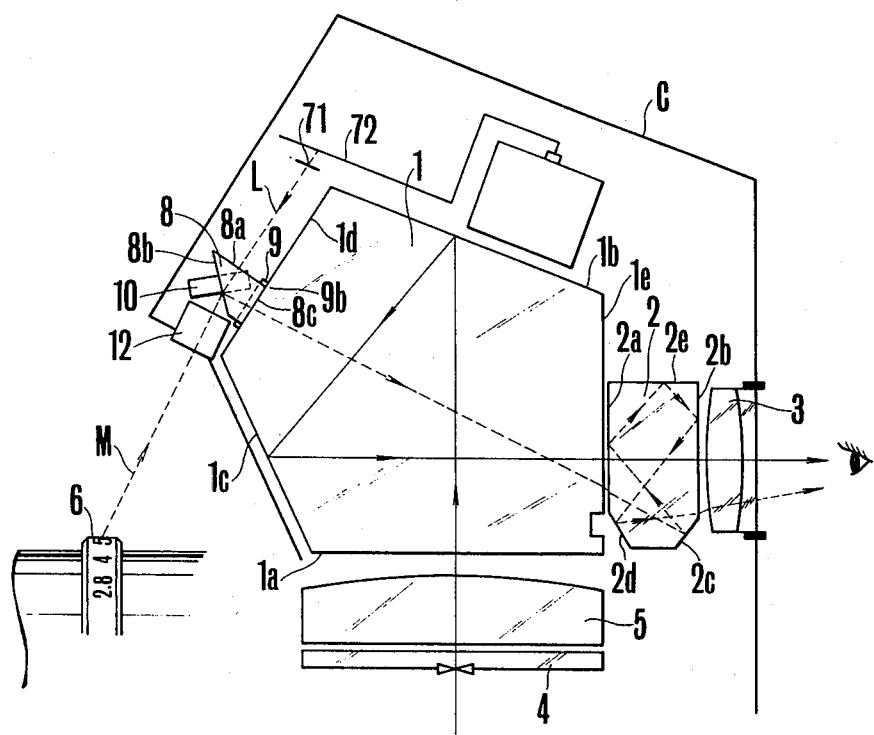
FIGS. 1 and 2 show the optical arrangement of a first embodiment, a finder for a single lens reflex camera according to the present invention.
Figure 2:
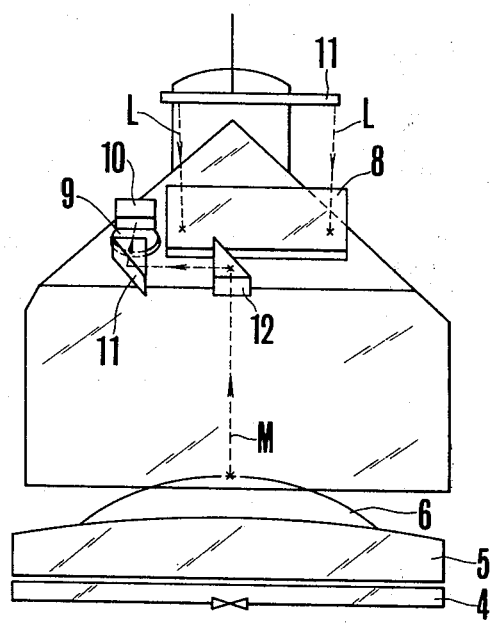
Figure 3:
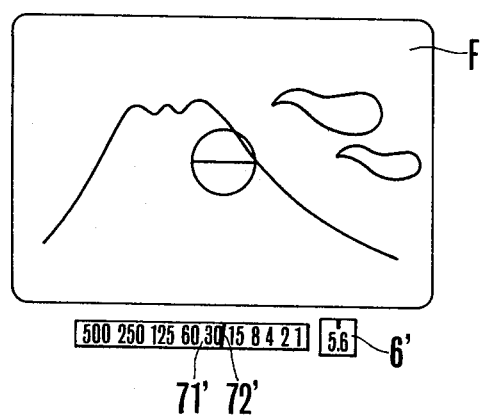
FIG. 3 shows the view field of the finder shown in FIG. 1.
Figure 4:
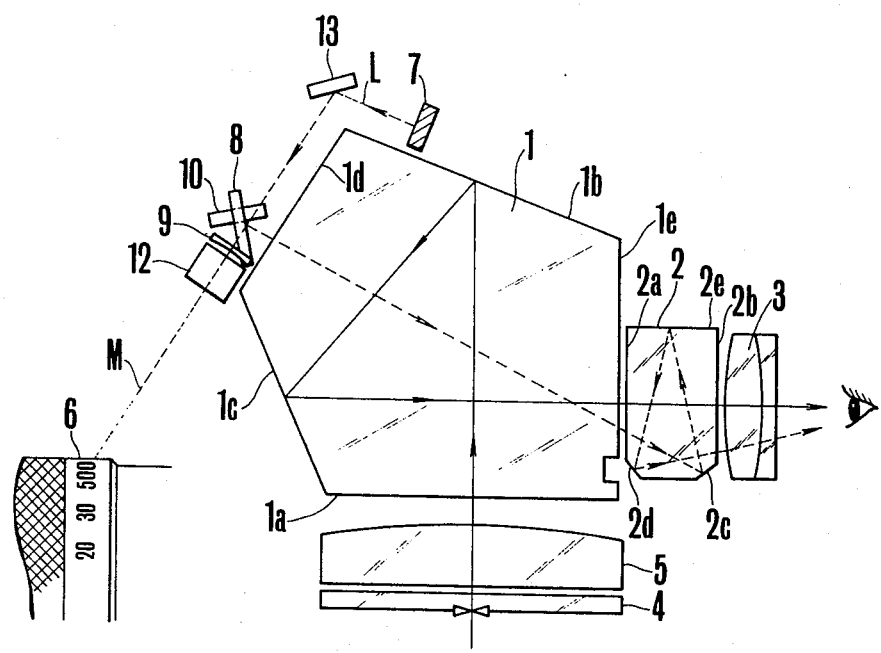
FIGS. 4 and 5 show the optical arrangement of a second embodiment according to the present invention.
Figure 5:
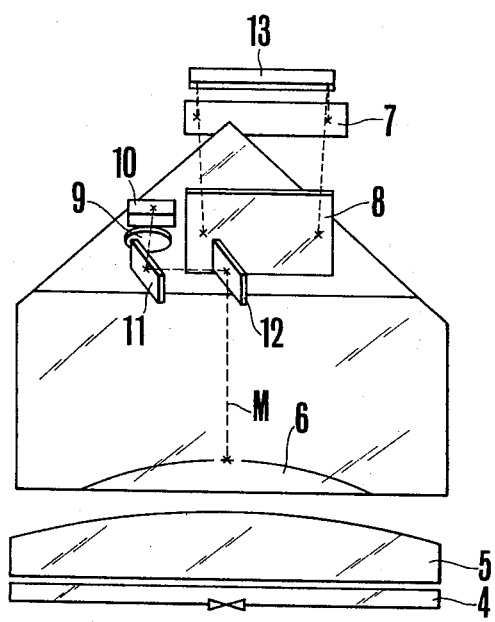
Figure 6:
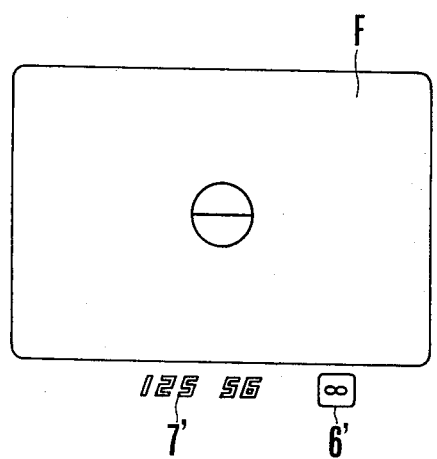
FIG. 6 shows the view field of the finder shown in FIG. 4.
Figure 7:
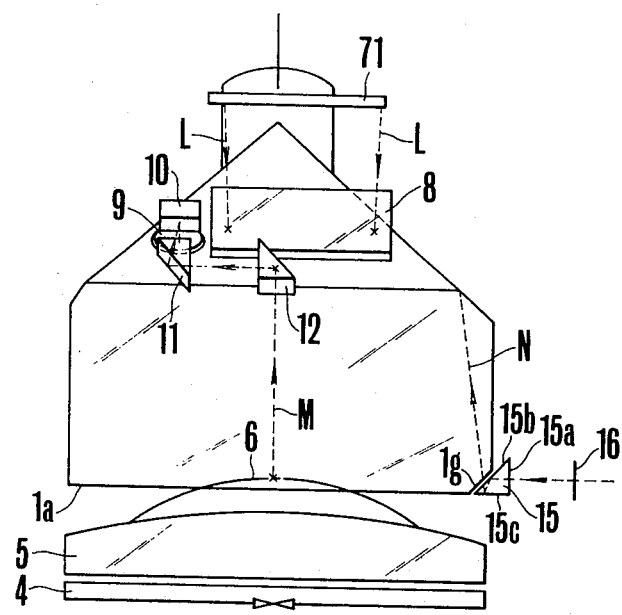
FIG. 7 shows the optical arrangement of a third embodiment according to the present invention.
Figure 8:
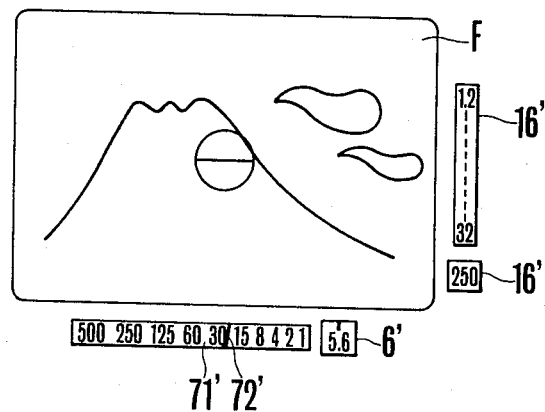
FIG. 8 shows the view field of a third embodiment of the finder according to the present invention.
Figure 9:
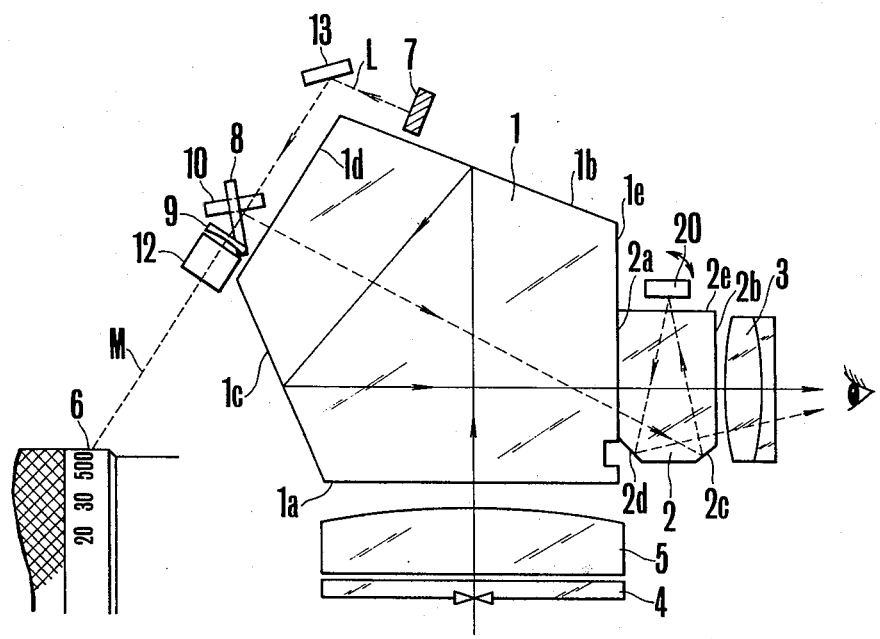
FIGS. 9 and 10 show a fourth embodiment of the finder according to the present invention.
Figure 10:
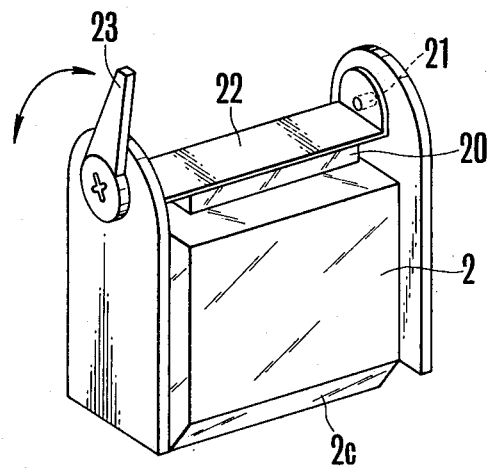

In FIGS. 1 and 2 showing a first embodiment of the present invention. C represents a camera casing and 1 is a penta roof prism and a light beam from the image of an object formed on a focusing glass 4 passes through a condenser lens 5, enters the prism 1 from the bottom incident surface 1a, reflected on the front reflecting surface 1c emitted from a rear exit surface 1e, passes through a sub-prism 2 and is directed to an ocular 3. The sub-prism 2 has a planar incidence surface 2a and a planar exit surface 2b parallel to each other, reflecting surfaces 2d and 2c in the lower portion of those parallel surfaces and a reflecting surface 2e in the upper portion of the same.

These reflecting surfaces 2d, 2c and 2e have each a reflecting film, such as of aluminum deposited thereon. 8 is a triangle prism having transmitting surfaces 8a and 8c and a reflecting surface 8b, and with the transmitting surface 8c being connected near the central portion of the front side upwardly inclined surface 1d of the penta roof prism, namely connected over the strip zone traversing the optical axis of the object lens. Therefore, this strip zone constitutes an incidence window.

The transmitting surface 8c may be arranged so as to oppose to the front upwardly inclined surface 1d with a small space therebetween, but it is more convinient to connect the surface 8c to the surface 1d because the two prisms can be easily handled as a single body and other advantages can be obtained. 71 and 72 are means for indicating informations of photographing conditions, such as shutter times and warning of a proper or improper adjustment of exposure. For example, a small meter, a luminant diode for signal indication and the like may be used as the indicating means. These information indicators are usually of relatively elongated shape as shown in FIGS. 1 and 2 in which 71 represents the shutter time scale and 72 is a meter pointer. The indication information light L emitting from the information indicating means 71 and 72 passes through the transmitting surface 8a of the triangle prism 8, reflected on the reflecting surface 8b and is directed below the rear exit surface 1e of the penta roof prism 1 from the transmitting surface 8c connected to the front inclined surface 1d of the penta roof prism 1. Then after emittance from the rear exit surface 1e of the prism 1, the light enters the sub-prism 2 from its transmitting surface 2a, reflected successively by each of surfaces 2c, 2a, 2e, 2b and 2d, and emitted from the transmitting surface 2b toward the ocular 3. 9 is a concave lens with its second surface 9b connected to the side of the front inclined surface 1d of the penta roof prism. This concave lens 9 and the triangle prism 8 are arranged in the plane inwhich is of small amplitude is indicated in the marginal portion while the shutter scale information which is of large amplitude is indicated in the central portion, that it is also possible to indicate a third information from the bottom entrance surface of the penta roof prism because this portion is not used, that an enough optical path can be provided in the prism because the information light is turned upward and then turned downward within the prism and that the structure is relatively small and provides much freedom for the arrangement of informations, thus providing many advantages in camera design works.

What is claimed is:

1. A single lens reflex camera comprising:
   an objective lens for forming an image of an object on a photosensitive surface and a focusing plate;
   a viewfinder optical system including a pentagonal roof prism having a front non-reflecting surface and an eyepiece for observing the object's image formed on the focusing plate;
   a first photographic data indicating means mounted on a lens barrel of said objective lens;
   a second photographic data indicating means located on the camera off said lens barrel;
   two information bearing light introducing windows on a front non-reflecting surface of said pentagonal roof prism, said two information bearing light introducing windows being arranged laterally of said front non-reflecting surface of the prism, one of said information bearing light introducing windows being offset from the middle section of said front non-reflecting surface and having a relatively small opening area, the other window being disposed across the middle section of the front non-reflecting surface and being of a laterally elongated shape having a relatively large opening area;
   first optical means facing said first data indicating means for deflecting first information bearing light from said first data indicating means either to the left or right of said front non-reflecting surface of the pentagonal roof prism and for directing the first information bearing light to one of said two information bearing light introducing windows on said front non-reflecting surface;
   second optical means for directing second information bearing light from said second data indicating body to the other information bearing light introducing window on said front non-reflecting surface; and
   third optical means for directing said first and second information bearing light to said eyepiece.

2. A single lens reflex camera according to claim 1, further including:
   a sub-prism disposed between the exit surface of said pentagonal roof prism and said eyepiece;
   said sub-prism having an incident surface arranged in parallel with the exit surface of said pentagonal roof prism, an exit surface and a plurality of reflection faces;
   said first and second information bearing lights passing through the incident surface of said sub-prism being reflected upwardly by one of the reflection faces in the lower part of the sub-prism to traverse the optical axis of said viewfinder optical system and then reflected downwardly by a reflection face on the upper part of the sub-prism again to traverse the optical axis of the viewfinder optical system so that said reflection faces within said sub-prism direct the first and second information bearing light to pass out of the sub-prism through the exit surface thereof.

3. A single lens reflex camera according to claim 2, wherein the length of an optical path from said second data indicating means through said pentagonal roof prism and to said eyepiece after reflection within said sub-prism is arranged to be approximately equal to the length of another optical path coming from the object's image formed on said focusing plate and leading to said eyepiece after simply passing through said pentagonal roof prism and said sub-prism without reflection within said sub-prism.

4. A single lens reflex camera comprising:
   an objective lens for forming an image of an object on a photosensitive surface and a focusing plate;
   a lens barrel on the objective lens;
   a viewfinder optical system including a pentagonal roof prism and an eyepiece for observing the object's image formed on the focusing plate and having a non-reflecting surface;
   first photographic data indicating means mounted on a lens barrel of said objective lens;
   second photographic data indicating means on the camera and off said lens barrel, the area of said second data indicating means being larger than that of said first data indicating means;
   two information bearing light introducing windows on the front non-reflecting surface of said pentagonal roof prism, said two information bearing light introducing windows being arranged in the lateral direction of said front non-reflecting surface of the pentagonal roof prism, one of said information bearing light introducing windows being set off the middle section of said front non-reflecting surface and having a relatively small opening area, the other being displayed across the middle section of the front non-reflecting surface and being of a laterally elongated shape having a relatively large opening area;
   optical means facing said first data indicating means for deflecting a first information bearing light from said first data indicating means to the side of said front non-reflecting surface of the pentagonal roof prism and to direct said first information bearing light to one of said two information bearing light introducing windows on said front non-reflecting surface;
   first optical means for directing a second information bearing light from said second data indicating means to the other information bearing light introducing window on said front non-reflecting surface;
   a lens system provided in an optical path between said first data indicating means and one of the information bearing light introducing windows of said non-reflecting surface for diopter adjustment;
   second optical means for directing the first and second information bearing lights so they are incident upon the front non-reflecting surface at about the same incident angle to the information bearing light introducing windows on said non-reflecting surface; and
   a sub-prism between the exit surface of the pentagonal roof prism and said eyepiece and having an incident surface parallel to the exit surface of the pentagonal roof prism and an exit surface as well as a plurality of reflection faces, said sub-prism having a lower part and an upper part with reflection faces in the lower and upper parts, a reflection face in the lower part of said sub-prism being arranged to reflect said first and second information bearing light which comes through the incident surface of said sub-prism upwardly to traverse the optical axis of said viewfinder optical system, and a reflection face in the upper part of said sub-prism being arranged to reflect the first and second information bearing light downward again to traverse the optical axis of the viewfinder optical system so that said first and second information bearing lights exit the sub-prism through the exit surface thereof and said reflection faces in the sub-prism serve to direct the first and second light to a lower part of said eyepiece;

said sub-prism being arranged such that the length of an optical path coming from said second data indicating means through said pentagonal roof prism and leading to said eyepiece after reflection within said sub-prism is approximately equal to the length of another optical path coming from the object's image formed on said focusing plate and leading to said eyepiece after simply passing through said pentagonal roof prism and said sub-prism without any reflection within said sub-prism.

* * * * *